United States Patent
Bush et al.

(10) Patent No.: US 11,449,526 B1
(45) Date of Patent: Sep. 20, 2022

(54) SELECTIVE DNS SYNCHRONIZATION

(71) Applicant: United Services Automobile Association (USAA), San Antonio, TX (US)

(72) Inventors: Kyle Patrick Bush, San Antonio, TX (US); Jason Paul Larrew, Helotes, TX (US); Orlando Alva, San Antonio, TX (US); Dan Asher Newburg, Devine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/330,141

(22) Filed: May 25, 2021

Related U.S. Application Data

(63) Continuation of application No. 16/687,320, filed on Nov. 18, 2019, now Pat. No. 11,036,759, which is a continuation of application No. 15/698,422, filed on Sep. 7, 2017, now Pat. No. 10,521,453.

(60) Provisional application No. 62/384,388, filed on Sep. 7, 2016.

(51) Int. Cl.
| | |
|---|---|
| *G06F 15/16* | (2006.01) |
| *G06F 16/27* | (2019.01) |
| *H04L 67/1095* | (2022.01) |
| *H04L 61/4511* | (2022.01) |
| *H04L 41/0893* | (2022.01) |

(52) U.S. Cl.
CPC ........ *G06F 16/273* (2019.01); *H04L 61/4511* (2022.05); *H04L 67/1095* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 7,680,876 B1 | 3/2010 | Cioli et al. | |
| 9,264,440 B1 | 2/2016 | Stern | |
| 9,426,049 B1 | 8/2016 | Kalavade et al. | |
| 9,756,012 B1* | 9/2017 | Pandya | H04L 61/3025 |
| 10,205,701 B1 | 2/2019 | Voss et al. | |
| 2001/0044834 A1 | 11/2001 | Bradshaw et al. | |
| 2006/0112176 A1 | 5/2006 | Liu et al. | |
| 2010/0217837 A1 | 8/2010 | Ansari et al. | |

(Continued)

*Primary Examiner* — Phuoc H Nguyen
(74) *Attorney, Agent, or Firm* — Fletcher Yoder, PC

(57) ABSTRACT

Systems and methods described herein provide selective synchronization of DNS records. A synchronization data store is synchronized by: obtaining a complete set of domain name system (DNS) records for a first data center; and copying the complete set of DNS records to the synchronization data store. After the synchronization data store is initialized, at a particular time interval, a snapshot of the complete set of DNS records is repeatedly collected. Differences between the copied complete set of DNS records of the synchronization data store and the snapshot of the complete set of DNS records are identified. The synchronization data store is updated with the differences and a determination is made as to whether the differences should be implemented at a second data center. When the differences should be implemented at the second data center, the differences are propagated to the second data center, otherwise they are not.

20 Claims, 3 Drawing Sheets

(56) References Cited

U.S. PATENT DOCUMENTS

| | | |
|---|---|---|
| 2012/0324183 A1 | 12/2012 | Chiruvolu et al. |
| 2014/0173135 A1* | 6/2014 | Varney ................ H04L 41/0893 709/245 |
| 2016/0127465 A1* | 5/2016 | Barstow ................ G06F 16/273 707/620 |
| 2016/0371319 A1 | 12/2016 | Park et al. |
| 2017/0054761 A1* | 2/2017 | Schryver ............. G06F 16/2379 |

* cited by examiner

SELECTIVE DNS SYNCHRONIZATION

CROSS-REFERENCE TO RELATED APPLICATION

This application is a continuation application that claims priority to and the benefit of U.S. patent application Ser. No. 16/687,320, entitled, "SELECTIVE DNS SYNCHRONIZATION," filed Nov. 18, 2019, which is a continuation application and claims priority to and the benefit of U.S. patent application Ser. No. 15/698,422, entitled, "SELECTIVE DNS SYNCHRONIZATION," filed Sep. 7, 2017, which claims priority to and the benefit of U.S. Provisional Application No. 62/384,388, entitled "SELECTIVE DNS SYNCHRONIZATION," filed Sep. 7, 2016, which is hereby incorporated by reference in its entirety for all purposes.

BACKGROUND

The present disclosure relates generally to Internet domain name system (DNS) administration. In particular, the current disclosure relates to synchronizing DNS records between multiple data centers.

The Domain Name System (DNS) is a naming system for computers, services, or any resource connected to the Internet or other network. The DNS maps various information, such as Internet Protocol (IP) addresses with domain names assigned to each of the participating entities, enabling translation between domain names (e.g., domain.com) and IP addresses. Thus, a component that attempts to access a domain name, such as domain.com may be routed to a corresponding IP address of a host component (e.g., a web server).

Many organizations maintain their own DNS configuration servers. Traditionally, when an organization maintains multiple DNS servers across different locations, a single DNS configuration is mirrored across each of the multiple DNS servers, resulting in identical DNS records at each DNS server. However, it is now recognized that this technique does not provide an efficient solution when certain DNS records should not be mirrored to all DNS servers, or when multiple DNS servers may make changes to a subset of the DNS records, while other DNS servers should not.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a tangible, non-transitory, machine-readable medium, comprising machine-readable instructions. The instructions, when executed by a hardware-based processor: initialize a synchronization data store, by: obtaining a complete set of domain name system (DNS) records for a first data center; and copying the complete set of DNS records to the synchronization data store. After the synchronization data store is initialized, at a particular time interval, the instructions repeatedly collect a snapshot of the complete set of DNS records. The instructions identify differences between the copied complete set of DNS records of the synchronization data store and the snapshot of the complete set of DNS records and update the synchronization data store with the differences. Further, the instructions determine if the differences should be implemented at a second data center, based upon tags, attributes, or both associated with one or more of the complete set of DNS records, characteristics of the differences, or both and if the differences should be implemented at the second data center, propagate the differences to the second data center, otherwise do not propagate the changes to the second data center.

In a second embodiment, a computer-implemented method, includes initializing a synchronization data store, by: obtaining a complete set of domain name system (DNS) records for a first data center and copying the complete set of DNS records to the synchronization data store. After the synchronization data store is initialized, at a particular time interval, the method includes repeatedly collecting a snapshot of the complete set of DNS records. The method includes identifying differences between the copied complete set of DNS records of the synchronization data store and the snapshot of the complete set of DNS records, updating the synchronization data store with the differences, determining the differences should be implemented at a second data center, based upon tags, attributes, or both associated with one or more of the complete set of DNS records, characteristics of the differences, or both, and propagating the differences to the second data center.

In a third embodiment, a computer system includes: a processor and a tangible, non-transitory, machine-readable medium, comprising machine-readable instructions. When executed by a processor, the instructions cause the processor to: at a particular time interval, repeatedly collect a snapshot of the complete set of DNS records, identify differences between the copied complete set of DNS records of the synchronization data store and a snapshot of the complete set of DNS records, update the synchronization data store with the differences, determine if the differences should be implemented at a second data center, based upon tags, attributes, or both associated with one or more of the complete set of DNS records, characteristics of the differences, or both, and if the differences should be implemented at the second data center, propagate the differences to the second data center, otherwise do not propagate the changes to the second data center.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward selectively synchronizing DNS records and/or DNS record modifications across multiple DNS servers. As used herein, DNS record modifications may refer to additions, edits (e.g., of characteristics of a DNS record), and/or deletions.

In particular, the current embodiments provide a hardware-implemented solution for determining synchronization factors, such as: ownership of particular DNS records, an indication of particular records that should not be synchronized, and/or DNS record change thresholds. DNS records may be automatically selectively synchronized based upon the synchronization factors.

As mentioned above, in certain situations, it may be desirable to synchronize certain DNS records, while not synchronizing other DNS records. The embodiments disclosed herein use selective synchronization logic to facilitate such selective synchronization.

Figure 1:
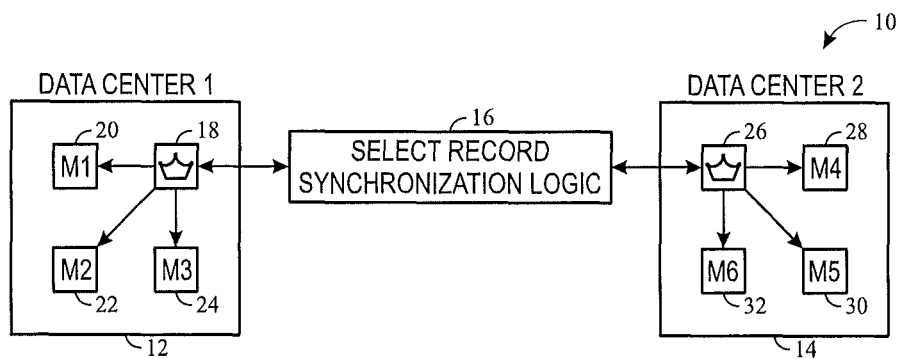
FIG. 1 is a schematic diagram illustrating a system with multiple data centers that uses select record synchronization logic, in accordance with an embodiment.

FIG. 1 is a schematic diagram illustrating a system 10 with multiple data centers (e.g., first data center 12 and second data center 14). The data centers 12 and 14 use select record synchronization logic 16 to selectively propagate DNS changes from one data center (e.g., first data center 12 and/or second data center 14) to other data centers (e.g., first data center 12 and/or second data center 14). The record synchronization logic 16 may make use of application programming interfaces (APIs) supplied by a DNS management system that is used to manage the DNS of the data centers. For example, in some embodiments, when an Infoblox® DNS management solution is used to manage a system's DNS, the Infoblox® APIs may be used by the select record synchronization logic 16 to implement the functionality described herein.

For example, in the current embodiment, the first data center 12 includes a master device 18, which receives and propagates DNS record changes to member devices 20, 22, and 24. Similarly, second data center 14 includes a master device 26, which receives and propagates DNS record changes to member devices 28, 30, and 32.

Further, modifications made at one data center (e.g., first data center 12 and/or second data center 14) by the master devices 18 and 26 (or the member devices 20, 22, 24, 26, 28, 30, and 32) may be discerned by the select record synchronization logic 16 and selectively propagated to one or more other data centers (e.g., first data center 12 and/or second data center 14). Accordingly, the select record synchronization logic 16 may provide an access gateway between DNS servers, enabling only certain changes to DNS records to pass to other data centers.

Figure 2:
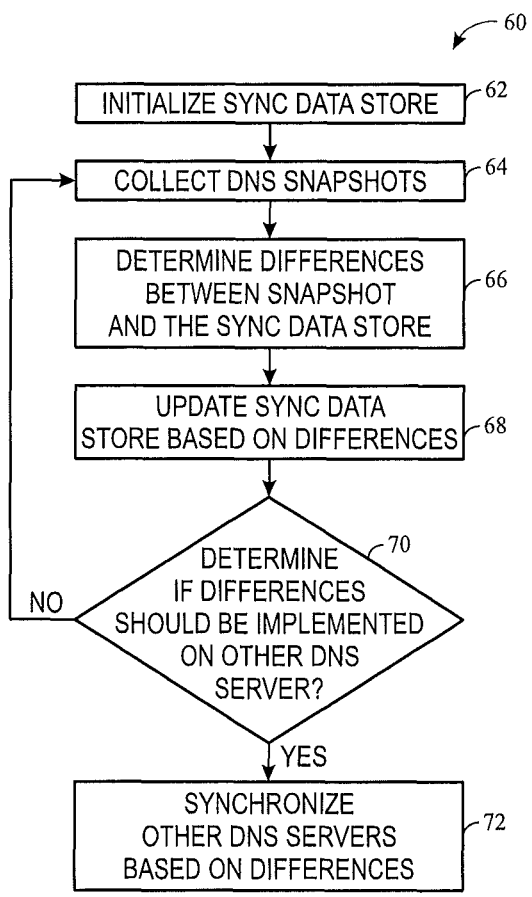
FIG. 2 is a flow chart illustrating a process for selectively synchronizing DNS records using the select record synchronization logic of FIG. 1, in accordance with an embodiment.

FIG. 2 is a flow chart illustrating a process 60 for selectively synchronizing DNS records using the select record synchronization logic 16 of FIG. 1, in accordance with an embodiment. Different embodiments may run the process 60 at different levels of granularity. For example, in some embodiments, the process 60 may be run at the domain level, while in other embodiments, the process 60 may be run iteratively for each DNS zone of a domain. DNS zones are partitioned portions of the domain name space, which allow for separate management. The DNS zones may be specified in the DNS server, by starting a list of DNS records with a Start of Authority (SOA) record that contains all records for the resources described within the zone.

The process 60 begins by initializing a synchronization data store (block 62). The data store is a tangible, non-transitory, machine-readable medium that stores a reference copy of DNS records for one or more of the data centers (e.g., first data center 12 and second data center 14). The initialization set (block 62) includes obtaining and copying, to the synchronization data store, a current state of all DNS records at the particular level of granularity (e.g., domain level and/or DNS zone level) of execution of the process 60. For example, when the process 60 is set to run at the DNS zone level, each DNS record of a first zone is obtained from the relevant DNS server and copied to the synchronization data store. This obtaining and copying of DNS records is continued until all records of the DNS server are copied to the synchronization data store. Further, this initialization process (block 62) may be implemented for all DNS servers that may propagate DNS record changes to other DNS servers. In some embodiments, the DNS records for different DNS servers may be copied to separate synchronization data stores, while in other embodiments, all DNS records may be copied to the same DNS data store, while providing an indication of which DNS sever the DNS records were obtained from.

Once each of the DNS records is copied to the synchronization data store, the process 60 may continue by periodically collecting DNS record snapshots (block 64). In some embodiments, the time period between collecting DNS snapshots may be based upon characteristics of the DNS records. For example, when the process 60 is executed at the DNS zone level of granularity, the time period between collections of DNS snapshots may be based upon the size (e.g., number of DNS records) of the particular DNS zone. In one embodiment, snapshots may be collected for larger DNS zones on a more frequent basis than for smaller DNS zones. Further, in some embodiments, snapshots may be collected less frequently (e.g., every 24 hours) for DNS zones with relatively fewer expected DNS record modifications than those with relatively more expected modifications (e.g., where snapshots may be collected every 4 hours).

In some embodiments, the select record synchronization logic 16 of FIG. 1 may determine the time period for collection of DNS snapshots based upon the serial number of the Start of Authority (SOA) Resource Record. Every time modifications are made to a DNS zone, the serial number associated with the SOA is changed. Accordingly, the select record synchronization logic 16 may poll for changes to this serial number, indicating that DNS record changes have occurred. When the serial number changes, the select record synchronization logic 16 may trigger immediate or delayed collection of a DNS snapshot for the zone associated with the changed serial number. Thus, each time a modification occurs and the serial number is changed, collection of a snapshot is triggered. As mentioned above, the trigger may be a delayed trigger (e.g., start collection 1 hour after serial number changes). The delayed trigger may be useful when multiple DNS record changes will happen with the delayed time period, as the system only collects one snapshot for all changes that may occur during the delayed time period.

After the snapshot is obtained, the select record synchronization logic 16 compares the snapshot with the records from the modifying data center that are stored in the synchronization data store (e.g., via the initialization step of block 62) (block 66). The comparison results in an indication of differences between the snapshot and the synchronization data store, which are the modified DNS records made at the data center.

The DNS records stored in the synchronization data store for the modifying data center are updated based upon the differences (block 68). For example, the new DNS record modifications are stored in the synchronization data store, replacing prior DNS records associated with the differences.

The select record synchronization logic 16 then determines if the differences should be implemented in other DNS servers (e.g. of other data centers) (decision block 70). For example, certain factors, such as record ownership, copy blacklists, and modification thresholds, are discussed herein that may indicate whether or not DNS record modifications should be propagated to other DNS servers. As used herein, DNS record "ownership" refers to an entity's right to add, delete, and/or modify a DNS record. This "ownership" may be derived from an explicit indication of a particular entity (e.g., data center) with ownership and/or may be given to a particular entity that is the original source of the DNS record.

If the differences should not be propagated, the process 60 may return to collecting new DNS snapshots without propagating the changes. However, when the differences should be synchronized to other DNS servers, the differences may be provided to these DNS servers, resulting in synchronization of these DNS servers based upon the differences (block 72).

Figure 3:
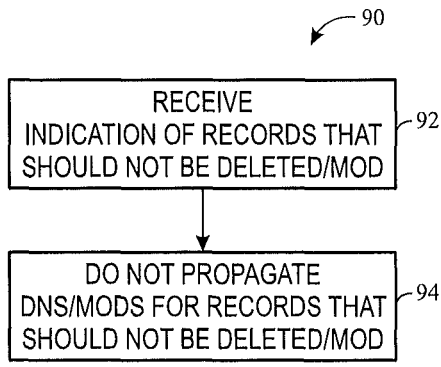
FIG. 3 is a flow chart illustrating a process for flagging records that should not be deleted during the process of FIG. 2, in accordance with an embodiment.

As mentioned above, certain DNS records may be blacklisted or otherwise unauthorized from propagation to other DNS servers. One instance where this might be useful is for DNS records for public-facing high visibility domains, where access to the associated domain name space is highly important. FIG. 3 is a flow chart illustrating a process 90 for flagging/blacklisting records that should not be deleted during the process of FIG. 2, in accordance with an embodiment.

The process 90 begins by receiving an indication of DNS records that should not be deleted and/or modified (block 92). For example, a DNS administrator may use tagging or attribute functionality of a DNS management graphical user interface or a command line interface to indicate particular records which the select record synchronization logic 16 should not delete and/or particular records which the select record synchronization logic 16 should not modify.

Deletion modifications for records that include a tag or attribute indicating that the records should not be deleted and modifications for records that include a tag or attribute indicating that the records should not be modified. Thus, these modifications and/or deletions are not propagated to other DNS servers (block 94). In other words, even when certain DNS records with these "no delete" tags and/or attributes are deleted in a data center (e.g., first data center 12 and/or second data center 14), the deletion of the DNS record will not be propagated to the other DNS servers, because the deletion modification is blocked, based upon the "no delete" tags and/or attributes. Similarly, even when certain DNS records with these "no modifications" tags and/or attributes are modified in a data center (e.g., first data center 12 and/or second data center 14), the modification of the DNS record will not be propagated to the other DNS servers, because the modification is blocked, based upon the "no modification" tags and/or attributes.

Figure 4:
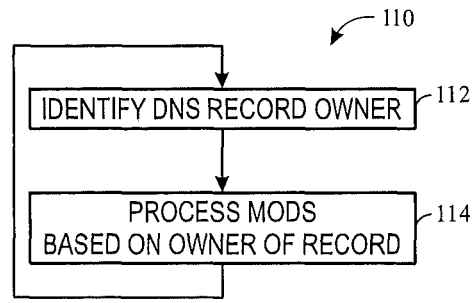
FIG. 4 is a flow chart illustrating identification and flagging of DNS record owners, which may be useful for determining whether record syncing should be implemented, in accordance with an embodiment.

Additionally, as mentioned above, owners may be attributed to particular DNS records. The ownership of a record may indicate particular actors (e.g., data centers) which are authorized to make modifications to owned DNS records. FIG. 4 is a flow chart illustrating a process 110 for identification and flagging of DNS record owners, which may be useful for determining whether record synching should be implemented, in accordance with an embodiment.

The process 110 begins by identifying DNS record owners for each of the DNS records (block 112). In some embodiments, the select record synchronization logic 16 determines a particular characteristic of the DNS records, which the select record synchronization logic 16 may use to assign an owner to the DNS records. For example, the select record synchronization logic 16 may attribute an owner (e.g., a data center) of particular DNS records based upon an IP subnet range of the DNS records, the hostnames in the DNS records, an entity that originally created the DNS record, etc.

DNS record modifications may be processed according to the DNS ownership. For example, in some embodiments, the owner of the DNS records may retain an exclusive right to modify records and/or may retain a superseding right to modify owned DNS records, in the event that multiple modifications to the same DNS record are detected by multiple DNS servers. Thus, when an exclusive right to modify is retained by an owner, only modifications made to that DNS record by the owning data center will be propagated to other DNS servers. Modifications made by non-owner DNS servers will be blocked from modifying the DNS record.

When the owner retains a superseding right to modify, in the event of conflicting DNS record modifications (e.g., the same DNS record is modified by two DNS servers within a certain threshold amount of time (e.g., 1 hour, 1 day, etc.)) modifications sourced from the owner data center will supersede modifications made by non-owner data centers. This may be true even when modifications made by non-owner data centers are received after those made by the owner data centers, as long as the modifications are all detected within the threshold amount of time. Modifications made subsequent to the threshold amount of time may be propagated, as the modifications will not be identified as a conflicting modification.

Figure 5:
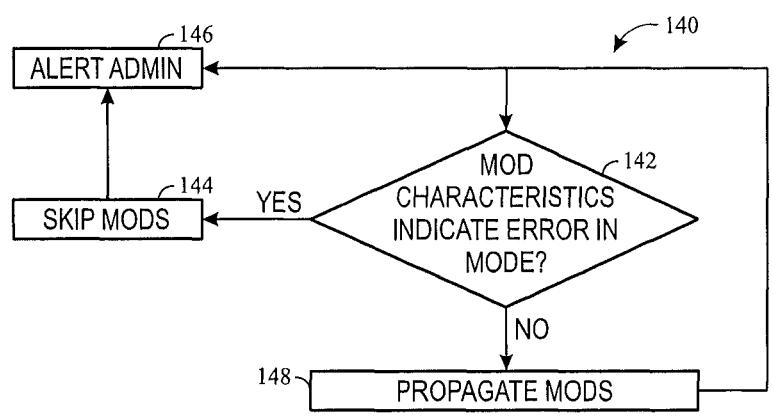
FIG. 5 is a flow chart illustrating a process for determining whether one or more records of a set of DNS changes should be synched to other DNS severs, in accordance with an embodiment.

Other factors may also be used to determine whether or not DNS record modifications should be propagated to other DNS servers. FIG. 5 illustrates an embodiment of a process 140 where the select record synchronization logic 16 of FIG. 1 may determine characteristics of identified modifications that may indicate situations where propagated modifications may not be desired. The process 140 begins with a determination of whether modification characteristics indicate an erroneous set of DNS record modifications (block 142). For example, the select record synchronization logic 16 may detect a relatively high number of DNS record modifications, which may indicate a malicious attack and/or other erroneous modifications to the DNS of one or more of the data centers. In one embodiment, the select record synchronization logic 16 may use a static threshold number of modifications as a measurement of whether or not erroneous modifications are likely present. Additionally and/or alternatively, a progressive threshold may be used, which looks at a previous number of modifications made (e.g., in a DNS zone and/or domain) and determines whether a current number of modifications are within a certain range of previous number of modifications. The previous number of modifications could be a rolling average of multiple prior modifications or may be a single previous number of modifications triggered by the last snapshot. For example, the select record synchronization logic 16 may average the number of modifications triggered by the last 10 snapshots and may determine whether the current number of modifications is within double (or some other frequency) the average of the last 10 snapshots. If the average number of modifications triggered by the last 10 snapshots is 30, then the progressive threshold for the current number of modifications triggered by the current snapshot would be 60.

If the thresholds are breached, the modification characteristics may indicate likely erroneous DNS record modifications. Accordingly, the entire set of modifications may be skipped (block 144). Additionally and/or alternatively, a DNS administrator may be alerted to the likely erroneous modifications (e.g., via email, via software alert, etc.) (block 146). In some embodiments, the DNS administrator may confirm or deny the changes in a data center, based upon the alert.

However, when the modification characteristics do not indicate likely erroneous modifications in decision block 142, the modifications may be propagated to other DNS servers. Accordingly, the modifications are propagated to the data centers (block 148) where the modifications may be implemented locally.

Figure 6:
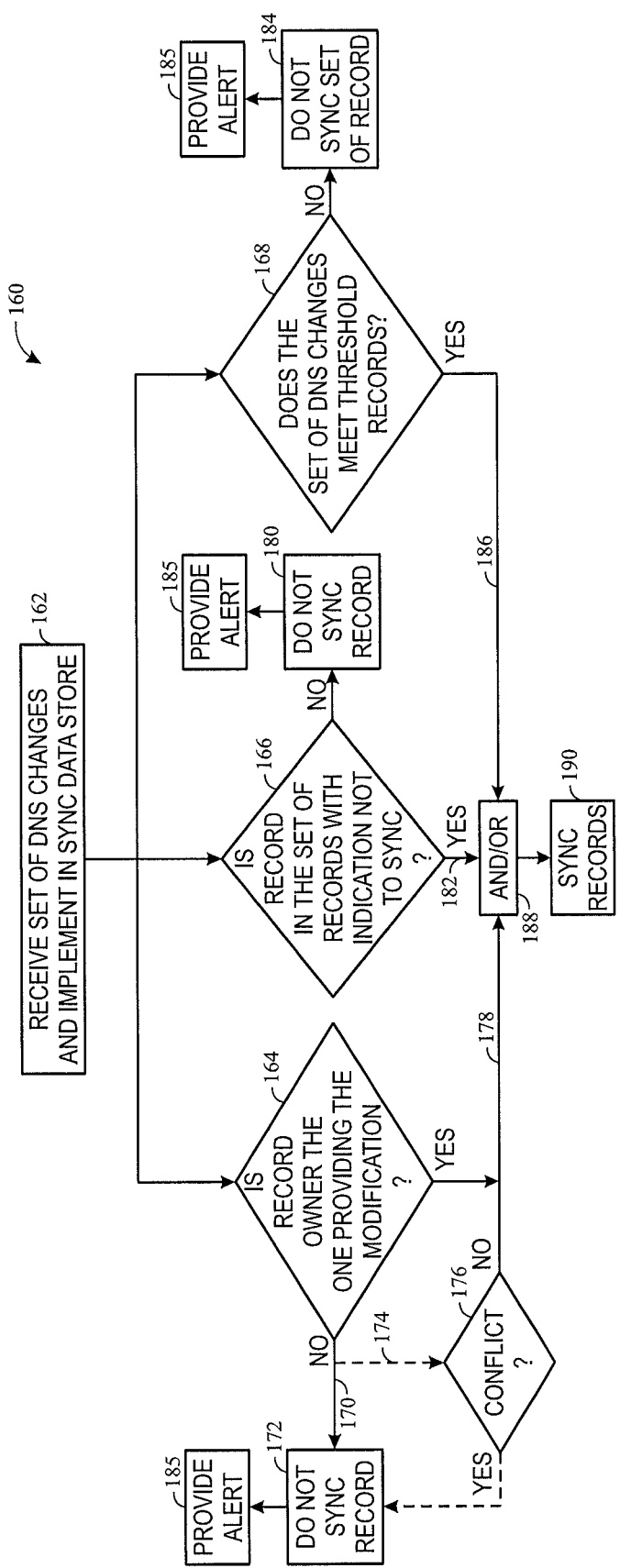
FIG. 6 is a flow chart illustrating a process for selectively synchronizing records based upon the factors described herein, in accordance with an embodiment.

FIG. 6 is a flow chart illustrating a process 160 for selectively syncing records based upon the factors described herein, in accordance with an embodiment. The process 160 begins by receiving and implementing DNS record changes in a synchronization data store (block 162), as discussed regarding FIG. 2.

Sequentially or in parallel, multiple DNS record modification checks may be performed. For example, either serially or in parallel, a determination is made as to the owner of the DNS records (decision block 164), a determination is made as to whether the record is in a set of records with an indication not to sync (e.g., modifications and/or deletions) (decision block 166), and a determination is made as to whether the characteristics of the set of received DNS changes meet threshold requirements (decision block 168).

As discussed above, depending on the implementation, various processing constrains may exist. For example, in some embodiments, when a non-record owner is providing the DNS record modification, the modification is not synchronized, as illustrated by path 170 and block 172. Alternatively, as illustrated by path 174, when the provider of the modification is not the owner of the DNS record, an additional determination may be made as to whether there are conflicting modifications (decision block 176). If there are conflicting modifications, the modification is not synchronized (block 172).

When the record owner is the one providing the DNS record modification (and/or in some embodiments when there are not conflicting modifications and a non-owner provided the DNS record modifications), processing of the modification may continue along path 178.

Further, when the DNS record is in a set of records with an indication not to synchronize modifications (e.g., edits, additions, and/or deletions), the modifications and/or deletions are not synchronized (block 180). However, when the record is not in such a set of records with an indication not to sync certain modifications (e.g., edits and/or deletions), processing of the modification may proceed along path 182.

Additionally, as mentioned above, in some embodiments, characteristics of the set of modifications (e.g., a number of modifications) may impact whether the modifications are propagated. When the characteristics of the set of modifications do not meet threshold requirements of the select record synchronization logic 16, the modifications are not synchronized (block 184). In each step where DNS record modifications are not synchronized (e.g., blocks 172, 180 and 184), an alert may be provided (e.g., in a log file, in an email, via a software alert, etc.), indicating that certain DNS entries were not synchronized, due to one or more of the automatic synchronization constraints not being met (block 185).

However, when the threshold requirements are met by the characteristics of the set of modifications, the processing of the modifications may continue along path 186. As illustrated by AND/OR block 188, in some embodiments, each of the determination blocks 164, 166, and 168 must pass along paths 178, 182, and 186, respectively, in order for synchronization of the modifications to occur (block 190). However, in some embodiments, only one or two of the determination blocks 164, 166, and 168 must pass along paths 178, 182, and 186, respectively, in order for synchronization of the modifications to occur (block 190).

As may be appreciated, the current embodiments result in efficient propagation of DNS records from one data center to another. Further, the current embodiments provide an added layer of security by determining likely erroneous DNS modifications, which can be blocked from propagation to other data centers, which may result in reduced network/system outages. Accordingly, the current techniques greatly enhance computer network functionality and improve the current functionality of DNS services within a data center.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A tangible, non-transitory, machine-readable medium, comprising machine-readable instructions that, when executed by one or more computer processors, cause the one or more computer processors to:
    initialize a synchronization data store, by:
        obtaining a complete set of domain name system (DNS) records for a first data center; and
        copying the complete set of DNS records to the synchronization data store;

after the synchronization data store is initialized, at a particular time interval, repeatedly collect a snapshot of the complete set of DNS records;
identify differences between the copied complete set of DNS records of the synchronization data store and the snapshot of the complete set of DNS records;
update the synchronization data store with the differences;
determine if the differences should be implemented at a second data center, by at least:
receiving an indication of DNS records not permitted for synchronization changes;
determining a subset of the differences associated with the DNS records not permitted for synchronization changes; and
determining that the subset of the differences associated with the DNS records not permitted for synchronization changes should not implemented; and
if the differences should be implemented at the second data center, propagate the differences to the second data center, otherwise do not propagate the changes to the second data center.

2. The tangible, non-transitory machine-readable medium of claim 1, comprising machine-readable instructions that, when executed by the one or more computer processors, cause the one or more computer processors to:
retrieve a deny list comprising a list of records not permitted for synchronization changes; and
determine the subset of the differences associated with the DNS records not permitted for synchronization changes based at least in part upon the deny list.

3. The tangible, non-transitory machine-readable medium of claim 2, comprising machine-readable instructions that, when executed by the one or more computer processors, cause the one or more computer processors to:
provide a domain name system (DNS) management interface, the DNS management interface comprising an affordance to apply an attribute, tag, or both to the DNS records indicating DNS actions not permitted for synchronization;
wherein the deny list is generated based upon applied attributes, tags, or both to the DNS records.

4. The tangible, non-transitory machine-readable medium of claim 3, wherein the attribute, tag, or both specifies a deletion action is not permitted for an applicable DNS record.

5. The tangible, non-transitory machine-readable medium of claim 4, wherein the attribute, tag, or both specifies a modification action is not permitted for an applicable DNS record.

6. The tangible, non-transitory machine-readable medium of claim 1, wherein the DNS records not permitted for synchronization changes are identified based upon the DNS records being public-facing with a threshold level of use in an enterprise.

7. The tangible, non-transitory machine-readable medium of claim 1, comprising machine-readable instructions that, when executed by one or more computer processors, cause the one or more computer processors to:
provide an administrative alert indicative of the subset of the differences associated with the DNS records not permitted for synchronization when the subset of the differences associated with the DNS records not permitted for synchronization changes exist.

8. A computer-implemented method, comprising:
initializing a synchronization data store, by:
obtaining a complete set of domain name system (DNS) records for a first data center; and
copying the complete set of DNS records to the synchronization data store;
after the synchronization data store is initialized, at a particular time interval, repeatedly collecting a snapshot of the complete set of DNS records;
identifying differences between the copied complete set of DNS records of the synchronization data store and the snapshot of the complete set of DNS records;
updating the synchronization data store with the differences;
determining if the differences should be implemented at a second data center, by at least:
receiving an indication of DNS records not permitted for synchronization changes;
determining a subset of the differences associated with the DNS records not permitted for synchronization changes; and
determining that the subset of the differences associated with the DNS records not permitted for synchronization changes should not implemented; and
if the differences should be implemented at the second data center, propagating the differences to the second data center, otherwise do not propagate the changes to the second data center.

9. The computer-implemented method of claim 8, comprising:
retrieving a deny list comprising a list of records not permitted for synchronization changes; and
determining the subset of the differences associated with the DNS records not permitted for synchronization changes based at least in part upon the deny list.

10. The computer-implemented method of claim 9, comprising:
providing a domain name system (DNS) management interface, the DNS management interface comprising an affordance to apply an attribute, tag, or both to the DNS records indicating DNS actions not permitted for synchronization;
wherein the deny list is generated based upon applied attributes, tags, or both to the DNS records.

11. The computer-implemented method of claim 10, wherein the attribute, tag, or both specifies a deletion action is not permitted for an applicable DNS record.

12. The computer-implemented method of claim 11, wherein the attribute, tag, or both specifies a modification action is not permitted for an applicable DNS record.

13. The computer-implemented method of claim 8, wherein the DNS records not permitted for synchronization changes are identified based upon the DNS records being public-facing with a threshold level of use in an enterprise.

14. The computer-implemented method of claim 8, comprising:
providing an administrative alert indicative of the subset of the differences associated with the DNS records not permitted for synchronization when the subset of the differences associated with the DNS records not permitted for synchronization changes exist.

15. A domain name system (DNS) synchronization device, comprising:
communications circuitry communicatively coupled to a first DNS record system and a second DNS record system;
one or more processors, configured to:
initialize a synchronization data store, by:
obtaining, via the communications circuitry, a complete set of domain name system (DNS) records for the first DNS record system; and copying the complete set of DNS records to the synchronization data store;

after the synchronization data store is initialized, at a particular time interval, repeatedly collect a snapshot of the complete set of DNS records;

identify differences between the copied complete set of DNS records of the synchronization data store and the snapshot of the complete set of DNS records;

update the synchronization data store with the differences;

determine if the differences should be implemented at a second DNS record system, by at least:

receiving an indication of DNS records not permitted for synchronization changes;

determining a subset of the differences associated with the DNS records not permitted for synchronization changes; and determining that the subset of the differences associated with the DNS records not permitted for synchronization changes should not implemented; and if the differences should be implemented at the second DNS system, propagate, via the communications circuitry, the differences to the second DNS system, otherwise do not propagate the changes to the second DNS system.

16. The DNS synchronization device of claim 15, wherein the one or more processors are configured to:

retrieve a deny list comprising a list of records not permitted for synchronization changes; and determine the subset of the differences associated with the DNS records not permitted for synchronization changes based at least in part upon the deny list.

17. The DNS synchronization device of claim 16, wherein the one or more processors are configured to:

provide a domain name system (DNS) management interface, the DNS management interface comprising an affordance to apply an attribute, tag, or both to the DNS records indicating DNS actions not permitted for synchronization;

wherein the deny list is generated based upon applied attributes, tags, or both to the DNS records.

18. The DNS synchronization device of claim 17, wherein the attribute, tag, or both specifies a deletion action is not permitted for an applicable DNS record.

19. The DNS synchronization device of claim 17, wherein the attribute, tag, or both specifies a modification action is not permitted for an applicable DNS record.

20. The DNS synchronization device of claim 15, wherein the DNS records not permitted for synchronization changes are identified based upon the DNS records being public-facing with a threshold level of use in an enterprise.

* * * * *